J. L. CREVELING.
METHOD OF CHARGING AND UTILIZING STORAGE BATTERIES.
APPLICATION FILED MAY 17, 1915.
1,250,978.
Patented Dec. 25, 1917.
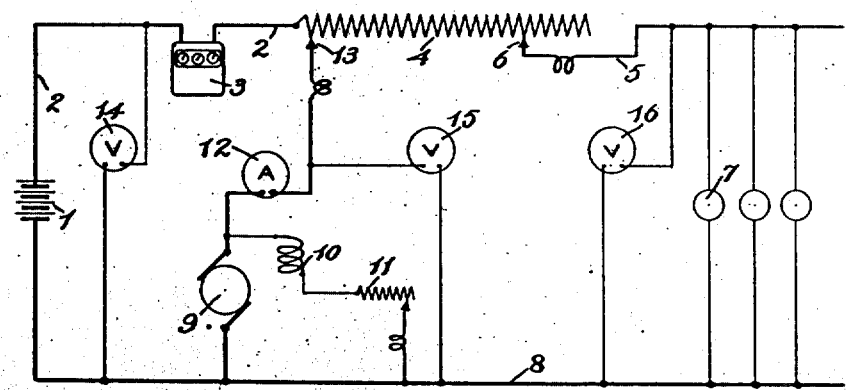
Fig. I.
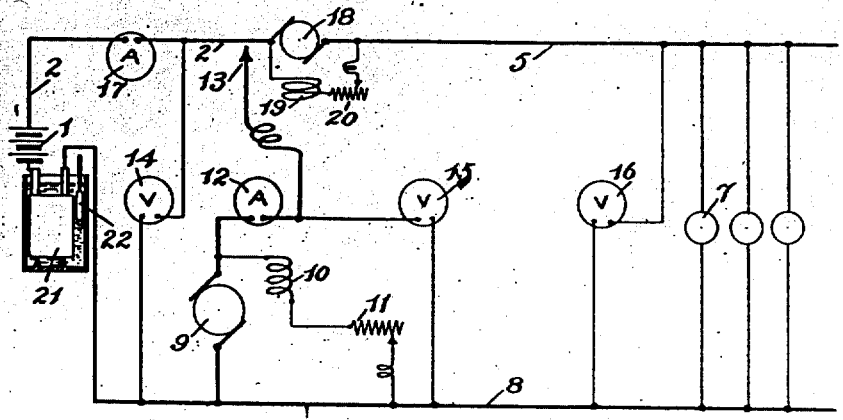
Fig. II.
INVENTOR:
John L. Creveling

UNITED STATES PATENT OFFICE.

JOHN L. CREVELING, OF AUBURN, NEW YORK.

METHOD OF CHARGING AND UTILIZING STORAGE BATTERIES.

1,250,978.      Specification of Letters Patent.      Patented Dec. 25, 1917.

Application filed May 17, 1915. Serial No. 28,726.

*To all whom it may concern:*

Be it known that I, JOHN L. CREVELING, a citizen of the United States, residing at Auburn, in the county of Cayauga and State of New York, have invented the new and useful Improvement in Methods of Charging and Utilizing Storage Batteries set forth in the annexed specification, wherein my invention is explained with reference to the annexed drawing, in order merely to add clearness in description, by means of diagrammatic or schematic representation of certain qualities and quantities and their mutual relations employed in practising my invention.

My invention, broadly stated, comprehends the method of charging and utilizing storage batteries in conjunction with translating devices and a variable controllable source of electrical potential difference wherein, during charging, the source of electrical potential difference supplies current to the battery against little opposition save that due to the characteristics of the battery itself, while the translating devices are controlled by opposition effective between the same and the battery and the said source of electrical potential difference, and wherein, when it is desired to discontinue charging the battery, the translating devices are supplied from the source of electrical potential difference with little opposition save that due to the characteristics of the translating devices themselves, while the battery is kept from discharging materially by opposition between it and the source of electrical potential difference and the translating devices.

The term "opposition" is used herein to denote the quality of opposing or resisting the flow of electric current, as for example that quality known as resistance, or that quality known as counter electro-motive-force, or any other current opposing quality.

The term "storage battery" is used herein to denote any means whereby electric energy may be stored, or converted into some other form of energy which, when desired, may be re-converted into electrical energy.

In the drawing, Figure I. is a diagrammatic or schematic representation of a battery, a variable controllable source of electrical potential difference and translating devices which may be caused to coöperate in accordance with my improved method by virtue of opposition afforded by that quality known as resistance.

Fig. II. is a diagrammatic or schematic representation of a battery, a variable controllable source of electrical potential difference and translating devices which may be caused to coöperate in accordance with my improved method by virtue of opposition afforded by that quality known as counter electro-motive-force.

In Fig. I., 1 represents a storage battery having its positive terminal connected as by wire 2 through a quantitative current measuring means 3, as for example, an ampere hour meter, with one end of an element 4 assumed to possess the quality of opposing current flow, known as resistance.

5 is a wire having one end provided with a movable contact 6, the position of which, it is assumed, may regulate the dimensions of the opposition or resistance to current flow from wire 2 to wire 5. The wire 5 is connected with the positive terminals of any suitable translating devices, indicated diagrammatically at 7, and having their negative terminals connected through the wire 8 with the negative terminals of the battery 1.

9 represents a source of variable and controllable electric potential difference, and for want of a better means of portrayal, is schematically indicated as a generator having field coil 10 and regulated by variable resistance 11. The negative terminal of the source of electrical potential difference 9 is connected with wire 8, while the positive terminal is connected through a rate of current flow measuring device, as for example an ordinary ammeter, with the movable contact 13, which, it is assumed, may be so moved as to regulate the opposition to flow of current from the source of potential difference to the battery 1 or translating devices 7, as will hereinafter more plainly appear.

14, 15 and 16 represent voltmeters, which may be used to indicate the voltage or potential difference across the battery 1, across the source of potential difference 9, and across the translating devices 7, respectively.

In Fig. II., like numerals indicate like parts or schematic representation of like qualities performing the same functions as in Fig. I. In this figure an ordinary ammeter 17 is shown in circuit with wire 2, instead of the ampere hour meter 3 of Fig. I., and one of the cells of the storage battery 2 is shown in section at 21, and indicated as having a hydrometer 22 in the electrolyte thereof, whereby changes in specific gravity of the electrolyte may be noted, if desired. The positive terminal of the variable controllable source of electrical potential difference 9 is shown as connected with the movable contact 13 which, it is assumed, may be connected either with wire 2 or wire 5, if desired, on the opposite sides of a source of opposition to current flow from wire 2 to wire 5, shown as a variable controllable counter electro-motive-force which, for want of better means of indicating, is depicted as a generator 18, provided with field coil 19 and controlled as by variable resistance 20.

With respect to Fig. I., my invention may be followed out or practised in substantially the following manner:

If the connectors 6 and 13 be disconnected from the element 4, there will be no voltage across translating devices 7 and the battery 1 will be on open circuit, and its open circuit voltage will be indicated by the voltmeter 14, and the source of electro-motive-force 9 will be disconnected from the other elements.

If it now be desired to operate the lamps or other translating devices 7 from the battery, the contact 6 may be brought into communication with the member 4, and current will then flow from the battery 1 through wire 2, meter 3, element 4, contact 6, and wire 5, to the translating devices 7, from which return will be made through the wire 8. And, if the battery have a voltage in excess of the voltage desired upon the translating devices, the proper voltage may be held upon the translating devices by selecting a proper value of the opposition or resistance to the current flow caused by the member 4.

If now it be desired to charge the battery 1, I so regulate the source of electrical potential difference 9, as for example by controlling the variable resistance 11, that the voltage across the said source, as indicated by the voltmeter 15, is substantially equal or slightly in excess of the voltage across the battery, as indicated by the voltmeter 14. I then connect the contact member 13 with the wire 2, including a very small portion, if any, of the member 4, so that there will be little opposition to current flowing from the generator through the battery. I then increase the potential difference across the source 9, as for example by regulating the resistance 11, until this increase in potential difference causes the desired current flow to be delivered as may be indicated by ammeter 12. Simultaneously with this increase of potential difference, I increase the opposition to current flow to the translating devices, as for example by moving the contact 6 in a righthanded direction to increase the resistance between the wire 5 and the wire 2, in such manner that I hold the voltage upon the translating devices 7 substantially constant while raising the voltage across source of electrical potential difference 9 and the storage battery.

If now, I have charged the storage battery until it is desired for any reason to cut down the charge, or cease charging the same—as for example, suppose it to have been charged until a certain number of ampere hours charge has been carried out, as may be indicated by the ampere hour meter 3, or suppose its voltage may have risen to a certain desired amount,—then I gradually move the contact member 13 in a righthanded direction and simultaneously and correspondingly lower the voltage across the source 9 until there is practically no opposition to current flow from the member 13 to the member 6, but there is considerable opposition to flow of current from the storage battery 2 through the resistance 4 to either contact 6 or 13. Simultaneously, I adjust the contact 6 so that substantially constant voltage is carried upon the translating devices 7 throughout the above outlined operation until 6 and 13 have substantially no resistance between them, and the voltage across the source 9, as indicated by the voltmeter 15, is that desired upon the translating devices 7, as indicated by voltmeter 16. Then, by increasing still further the value of the current opposition or resistance 4, even to infinity, if desired, I may cause discharge from the storage battery 2 to the translating devices to be decreased until negligible, or, in the extreme case, to zero.

Under these conditions, it will now be noted that the source of potential difference 9 is supplying current to the translating devices 7, while the storage battery 2 is at a higher voltage than the said source 9, but is restrained from supplying any appreciable current to the translating devices or back through the said source by the opposition indicated at 4. And, if at any time it is desired, while operating under these conditions, to charge the battery further, the contact 13 may be moved to lessen and gradually cut out the opposition to current flow from the source of potential difference 9 while the said potential difference is simultaneously increased to produce the desired charge, and the translating voltage may be held constant throughout this period by properly dimensioning the opposition to current flow to the translation circuit, as by manipulation of the contact 6. That is, to take a numerical example, if 1 represent an ordinary lead storage battery with a normal working voltage of say 60 volts, it may be charged until a given amount of current is forced through it as indicated by the ampere hour meter 3, or it may be charged until the voltage, as indicated by the voltmeter 14, reaches a desired value which in the case of a full charge would be substantially 80 volts, without any of the resistance 4 in circuit with the generator and the storage battery while sufficient resistance may be imposed between 13 and 6 that the normal working voltage or 60 volts, will be impressed upon the translating devices 7.

Then, if it be desired to cut off the charge substantially, the resistance between 13 and 6 may be practically withdrawn, while the potential difference across 9 is being reduced from 80 to 60 volts. And then further increase in the resistance 4 will still further decrease any discharge from the battery to the translation circuit, which will practically be supplied from the source 9 at substantially 60 volts, even though the battery voltage may be quite in excess of this value.

With reference to Fig. II, my method of operation may be carried out as follows:

If current be flowing from battery 1 through wire 2, ammeter 17, source of counter electro-motive-force 18, wire 5, translating devices 7, and wire 8, to the battery, and the voltage across the battery be in excess of the voltage desired across the translating devices 7, the translating voltage may be decreased to normal by increasing the counter electro-motive-force or opposition to current flow indicated at 18, as for example, by regulating resistance 20.

If now it be desired to charge the battery, I cause the potential difference indicated by the voltmeter 15 to be substantially equal to that indicated by the voltmeter 14, and then connect the contact 13 with the wire 2. I then increase the potential difference across the source 9, as by means of regulating resistance 11, and send a desired current, as indicated by ammeter 17, through the storage battery 1, simultaneously increasing the counter electro-motive-force or opposition indicated at 18, as by adjusting the resistance 20, so that the desired normal voltage remains impressed upon the translating devices 7, as indicated by the voltmeter 16.

If now, I have charged the battery as much as desired or until a certain current has passed therethrough, as indicated at the ammeter 17, for a desired length of time, or, for example, until the specific gravity of the electrolyte has risen to a desired degree, as indicated by the hydrometer 22, I then gradually decrease the voltage across the source 9 until the source is causing very little current to be delivered, and simultaneously regulate the counter electro-motive-force 18 to hold the voltage across the translating devices substantially constant.

I then move the contact 13 to wire 5 and adjust the potential difference across 9 to be substantially that desired upon the translating devices 7, and then increase the counter electro-motive-force 18 so that there is substantially no current flowing in either direction across the same and the batteries are maintained in their charged state, while the translating devices are supplied from the source 9 which is delivering substantially their normal voltage.

If now it be desired to discontinue using current from the source 9, I gradually lower the counter electro-motive-force 18 until the current to the translating devices is substantially all supplied by the battery, and then return the contact 13 to the position shown in the drawing, disconnecting the source of potential difference 9 from the other instrumentalities, and so long as the voltage across the battery remain in excess of that desired across the translating devices, the translating voltage may be readily regulated by regulating the amount of the counter electro-motive-force 18.

From the foregoing it will be noted that I have invented a method of utilizing storage batteries and translating devices in cooperation with a variable source of electrical potential difference wherein the battery may be kept charged, when desired, to a voltage above that held upon the translating devices with little waste of energy in instrumentalities used for the purpose of regulation, while at any time the translating devices may be supplied by the storage battery upon cessation of sufficient current being delivered by said source of electrical potential difference, under which condition the voltage upon the translating devices may be readily regulated so long as that of the storage battery remain at or above the normal translating voltage.

I do not wish in any way to limit the scope of claim or title to my invention by the employment of such diagrammatic or schematic representations as I have chosen to use and describe in this specification for the purpose of explaining some particular examples of employment of my method, for the said method may be carried out with the assistance of the qualities possessed by many and devious forms of instrumentalities or elements without departing from the spirit and scope of my invention, which is as set forth in the following claims, wherein the term "minor opposition" is used to denote zero opposition, negligible opposition, or opposition so small as to be of little or comparatively little moment as a regulating factor; and "appreciable opposition" is used to denote opposition of dimensions useful to produce a regulating effect desired in the practice of my method, and the term "desired" is used in a broad sense, to include such meanings as desirable, expedient, or necessary, for any reason whatever.

Claims.

1. The method of utilizing storage batteries and translating devices in cooperation with a controllable source of electrical potential difference which comprehends charging a battery from said source against minor opposition while supplying the translating devices from said source against appreciable opposition till desired to cease charging the battery and then supplying the translating devices from said source at a lower voltage than the battery and restraining the battery from materially discharging by opposition to current flow therefrom.

2. The method of utilizing storage batteries and translating devices in coöperation with a variable source of electrical potential difference which comprehends charging a battery from said source against minor opposition and regulating the charging rate by regulating the said source while supplying the translating devices from said source and regulating the voltage impressed upon the translating devices by opposition to current flow from said source thereto, till desired to cease charging the battery and then supplying the translating devices from the source of electrical potential difference against minor opposition at a voltage below that of the battery while restraining the battery from materially discharging by opposition to current flow therefrom.

3. The method of utilizing storage batteries and translating devices in coöperation with a controllable source of electrical potential difference which comprehends charging a battery from said source against minor extraneous opposition while supplying the translating devices from said source against appreciable regulative opposition till cessation of charging and then supplying the translating devices from said source at a voltage below that of the battery and opposing discharge of said battery thereto.

4. The method of utilizing storage batteries and translating devices in coöperation with a variable controllable source of electrical potential difference which comprehends charging a battery from said source against minor extraneous opposition and regulating the charging rate by regulating said source while supplying the translating devices from said source and regulating the voltage impressed upon the translating devices by opposition to current flow from said source thereto till cessation of charging the battrey and then supplying the translating devices from the source of electrical potential difference at a voltage below that of the battery against minor regulative opposition while restraining the battery from materially discharging by opposition to current flow therefrom and regulating the voltage on the translating devices by regulating said source of electrical potential difference.

5. The method of utilizing storage batteries and translating devices in coöperation with a controllable source of electrical potential difference which comprehends charging a battery from said source without regulative opposition while supplying the translating devices from said source against regulative opposition till cessation of charging the battery and then supplying the translating devices from said source at a voltage below that of the battery and restraining the battery from materially discharging by opposition to current flow therefrom.

6. The method of utilizing storage batteries and translating devices in coöperation with a controllable source of electrical potential difference which comprehends charging a battery from said source without regulative opposition and regulating the charging rate by regulating the said source while supplying the translating devices from said source and regulating the voltage impressed upon the translating devices by regulative opposition to current flow from said source thereto till cessation of charging the battery and then supplying the translating devices from the source of electrical potential difference without regulative opposition at a voltage below that of the battery while restraining the battery from materially discharging by opposition to current flow therefrom.

7. The method of utilizing storage batteries and translating devices in coöperation with a controllable source of electrical potential difference which comprehends charging a battery from said source without regulative opposition and regulating the charging rate by regulating the said source while supplying the translating devices from said source and regulating the voltage impressed upon the translating devices by regulative opposition to current flow from said source thereto till cessation of charging the battery and then supplying the translating devices from the source of electrical potential difference without regulative opposition at a voltage below that of the battery while restraining the battery from materially discharging by opposition to current flow therefrom and regulating the voltage upon the translating devices by regulating the source of electrical potential difference.

8. The method of utilizing storage batteries and translating devices in coöperation with a controllable source of electrical potential difference which comprehends charging a battery from said source and regulating the charge by regulating said source while supplying the translating devices from said source and regulating the voltage upon the said translating devices by opposing the flow of current from said source thereto until cessation of charge and then supplying the translating devices from said source at a voltage below that of the battery and regulating the voltage upon said translating devices by regulating said source and opposing discharge of the battery thereto.

9. The method of utilizing storage batteries and translating devices in coöperation with a controllable source of electrical potential difference which comprehends charging a battery from said source and regulating the charge by regulating said source while supplying the translating devices from said source and regulating the voltage upon the said translating devices by opposing the flow of current from said source thereto until cessation of charge and then supplying the translating devices from said source at a voltage below that of the battery and regulating the voltage upon said translating devices by regulating said source and opposing discharge of the battery thereto and upon insufficiency of said source of electrical potential difference supplying the translating devices from said battery and regulating the voltage upon the translating devices by opposition to flow of current thereto.

10. The method of utilizing storage batteries and translating devices in coöperation with a controllable source of electrical potential difference which comprehends charging a battery from said source without regulative opposition while supplying the translating devices from said source against regulative opposition till cessation of charging the battery and then supplying the translating devices from said source at a voltage below that of the battery and restraining the battery from materially discharging by opposition to current flow therefrom and upon insufficiency of said source of electrical potential difference supplying the translating devices from said battery and regulating the voltage upon the translating devices by opposition to flow of current thereto.

11. The method of utilizing storage batteries and translating devices in coöperation with a controllable source of electrical potential difference which comprehends charging a battery from said source and regulating the charge by regulating said source while supplying the translating devices from said source and regulating the voltage upon the said translating devices by opposing the flow of current from said source thereto until cessation of charge and then supplying the translating devices from said source at a voltage below that of the battery and regulating the voltage upon said translating devices by regulating said source and opposing discharge of the battery thereto and upon insufficiency of said source of electrical potential difference supplying the translating devices with current from said battery and regulating the current thus supplied to the translating devices by opposition thereto.

12. The method of utilizing storage batteries and translating devices in coöperation with a controllable source of electrical potential difference which comprehends charging a battery from said source without regulative position while supplying the translating devices from said source against regulative opposition till cessation of charging the battery and then supplying the translating devices from said source at a voltage below that of the battery and restraining the battery from materially discharging by opposition to current flow therefrom and upon insufficiency of said source of electrical potential difference supplying the translating devices from said battery and regulating the current supplied to the translating devices by opposition thereto.

JOHN L. CREVELING.